Oct. 22, 1963   C. D. LUCAS   3,107,905
BELLEVILLE SPRING ELASTIC SUSPENSION
Filed Oct. 19, 1960   2 Sheets-Sheet 1

INVENTOR:
CHARLES D. LUCAS

BY Eaton, Bell, Hunt & Seltzer
ATTORNEYS

Oct. 22, 1963 C. D. LUCAS 3,107,905
BELLEVILLE SPRING ELASTIC SUSPENSION
Filed Oct. 19, 1960 2 Sheets-Sheet 2
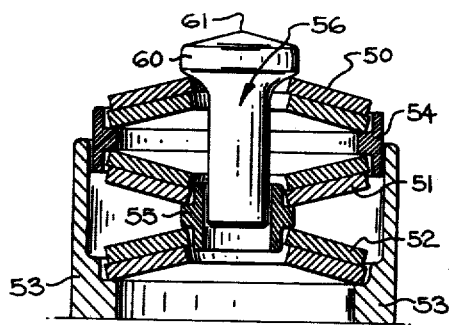
Fig-7
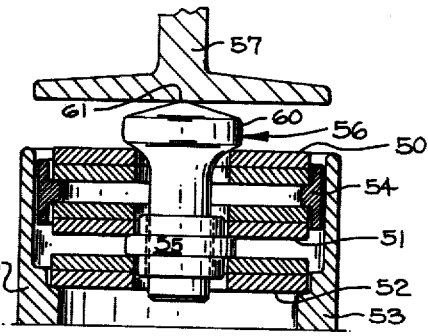
Fig-8
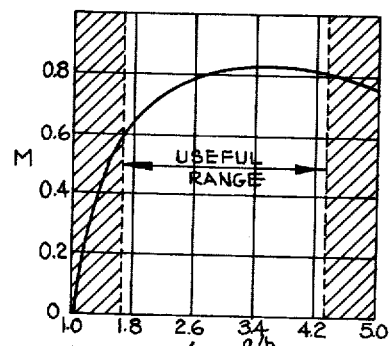
Fig-9
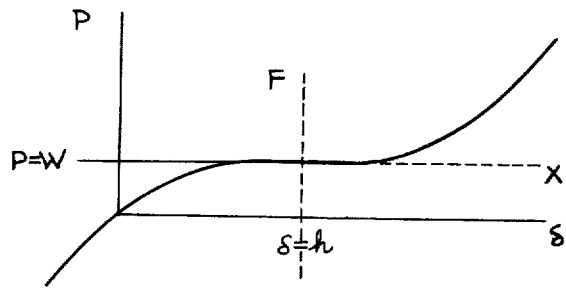
Fig-10
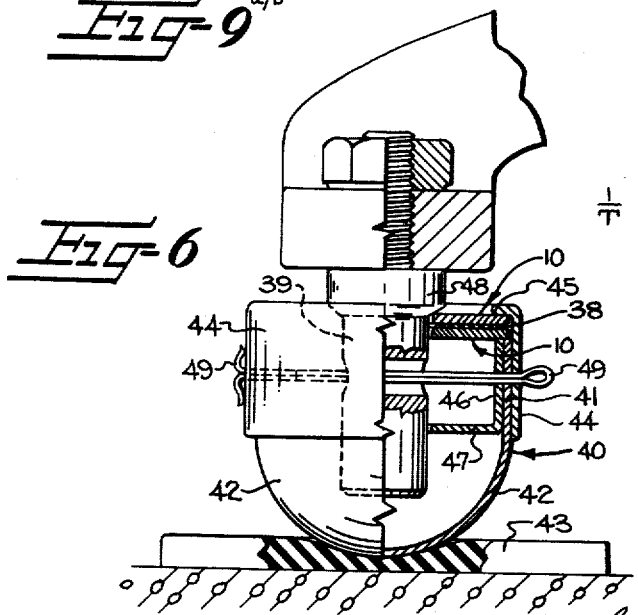
Fig-6
Fig-11
INVENTOR:
CHARLES D. LUCAS
BY Eaton, Bell, Hunt & Seltzer
ATTORNEYS

United States Patent Office 3,107,905
Patented Oct. 22, 1963

3,107,905
BELLEVILLE SPRING ELASTIC SUSPENSION
Charles D. Lucas, Clemson, S.C.
(104 Maple St., Morgantown, W. Va.)
Filed Oct. 19, 1960, Ser. No. 63,689
11 Claims. (Cl. 267—1)

This invention relates to spring washers, and more particularly to a Belleville spring assembly so constructed as to have force-deflection characteristics suitable for preventing the transmission of the harmful effects of shock and vibration.

It is common practice to provide isolators in the form of rubber pads for mounting machinery equipment to isolate the support (e.g. floor) for the machinery from periodic exciting forces resulting from the operation of movable members in the machinery which would otherwise be transmitted to its support and cause undesirable shaking of the floor and building. It has been determined that the successful isolation of a machinery support, or for that matter, any object from the reaction of a periodic exciting force requires the natural frequency of the elastic suspension (i.e. the isolators and the object being isolated) to be substantially lower than the frequency of the exciting force (i.e. vibration of the moving members) which is involved. All elastic suspensions heretofore known exhibit some natural harmonic frequency, and it is this frequency which must be substantially lower than the frequency of the exciting force in accordance with sound engineering practices of vibration reduction by isolation. The isolation of a mass under the action of very low frequency excitation from its support by applying the principle mentioned above presents a particularly difficult problem in that conventional elastic suspensions possessing a relatively low natural frequency are unstable and efforts to design an elastic suspension having a natural frequency which is further reduced have only succeeded in adding to the instability of the elastic suspension, thereby leading to rather large deflections or movements of the mass. A typical example where this problem occurs is in the design of elastic suspensions for a textile loom.

Elastic suspensions are designed to reduce significantly the severity of shock and vibration transmitted by moving members of an object or mass by mounting the object upon an isolator(s) which is adapted to temporarily serve as a reservoir in storing energy therewithin for subsequent release in a different time relation or a form less likely to cause a large deflection of the mass. This temporary storage of energy within the isolator(s) is accomplished by flexure or deflection of the isolator(s) within its elastic limit. Inasmuch as the frequency range of exciting forces may vary to a considerable degree, it has been necessary to design elastic suspensions for critical values of such exciting force frequencies to insure that a resonant frequency condition does not occur. Thus, using the example of a punch press and a supporting floor therefor, the design of an elastic suspension contemplates the isolation of the punch press against the transmission of impacts into the floor. However, the exciting force in such an instance comprises many frequency components and it is generally considered to be impractical to design the elastic suspension for the lowest frequency in the composite exciting force because this would tend to create instability in the suspension (i.e. a large deflection or movement of the punch press).

Belleville springs have been virtually ignored as proper elements for isolators in elastic suspensions, perhaps because of the generally accepted belief that Belleville springs are examples of "soft-springs" or springs that have a spring rate which decreases as the spring is loaded—a property unlikely to find favor in an elastic suspension which depends upon isolator elements having a restoring force characteristic capable of returning the isolated mass to a position of equilibrium with a minimum amount of deflection when disturbed by some exciting force. Conventional elastic suspensions therefore commonly rely upon an isolator element(s) exhibiting a "hard-spring" effect wherein the spring rate increases as the deflection of the isolator element(s) increases in accordance with an increase in the load placed thereon.

It is therefore a principal object of this invention to provide a novel elastic suspension utilizing a Belleville spring assembly which will avoid the occurrence of a resonant frequency condition by having a reduced natural frequency approximating an infinitely low natural frequency without sacrificing the stability of the elastic suspension. By "infinitely low natural frequency," I mean that there is no small range of amplitudes where the frequency of the free vibration of the elastic suspension will be approximately constant.

It is another object of this invention to provide a novel Belleville spring assembly having force-deflection characteristics suitable for isolating a mass of predetermined weight from shock and vibration, wherein the Belleville spring assembly is initially loaded by the weight of the mass to assume a flat stressed condition when in equilibrium therewith for exhibiting a "hard-spring" effect in response to excitations of force or motion which tend to deflect the Belleville spring assembly beyond its flat state at the position of equilibrium in either direction.

Some of the objects of the invention having been stated, other objects will appear as the description proceeds when taken in connection with the accompanying drawings, in which—

FIGURE 6 is an elevational view, partially in section, of another practical embodiment of my invention illustrating a Belleville spring assembly in an elastic suspension, showing a pair of Belleville springs in flat stressed condition for isolating a vibrating machine from its supporting surface;

FIGURE 7 is a sectional view of a modified Belleville spring assembly constructed in accordance with the present invention, wherein a plurality of Belleville springs are arranged in a symmetrical parallel-series assembly, the Belleville spring assembly being shown in unstressed condition prior to being placed under load;

FIGURE 8 is a sectional view of a modified elastic suspension showing the Belleville spring assembly of FIGURE 7 in flat stressed condition when placed under load by an object to be isolated;

FIGURE 9 is a graph for comparing the value of a spring constant M, occurring in the load-deflection formula for a Belleville spring derived by Almen and Laszlo, to the outside diameter-inside diameter ratios of Belleville springs;

Figure 1:
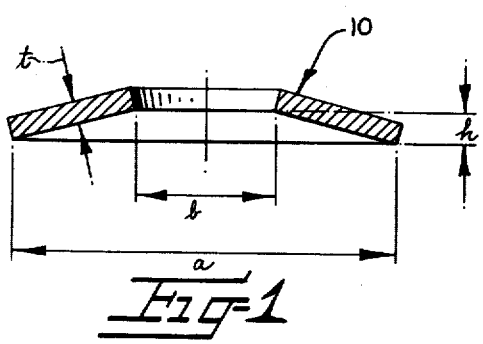
FIGURE 1 is a sectional view of a Belleville spring constructed in accordance with the present invention as it appears when in unstressed condition.

FIGURE 10 is a graph showing a characteristic load-deflection curve for a Belleville spring constructed in accordance with the present invention; and FIGURE 11 is a graph plotting the characteristic frequency of the free vibrations versus the amplitude of various elastic suspensions to compare the response of linear elastic suspensions, non-linear elastic suspensions relying upon rubber, cork or felt pads, and non-linear elastic suspensions of the type utilizing a Belleville spring constructed in accordance with the present invention.

In the several embodiments of the invention which are illustrated, these embodiments being by way of example only, the present elastic suspension relies upon a novel relationship between a Belleville spring assembly and the object or mass which is to be isolated. A Belleville spring may be described as a substantially frustoconical disc spring of uniform thickness and having an unstressed or free cone height $h$. The following experimentally proved load-deflection formula for a Belleville spring has been derived by J. O. Almen and A. Laszlo and is discussed in volume 58, pages 305–314 of "A.S.M.E. Transactions" (1936), in an article entitled "The Uniform Section Disc Spring":

$$P = \frac{E\delta}{(1-\sigma^2)Ma^2}\left[(h-\delta)\left(h-\frac{\delta}{2}\right)t + t^3\right]$$

where $P$=applied force on a Belleville spring, $a$=outer diameter, $t$=thickness, $h$=free cone height, $\delta$=axial deflection of Belleville spring due to the applied force, $M$=spring constant at a function of the outer diameter-inner diameter ratio of a Belleville spring, $E$=Young's modulus, and $\sigma$=Poisson's ratio. The Almen and Laszlo formula closely conforms to test results in loading Belleville springs when the following limitations are observed: (a) outer diameter-inner diameter ratios $a/b$ should lie between 1.7 to 4.25, and (b) free cone height-thickness ratios $h/t$ should lie between 0 to 2.5. Reference is made to FIGURE 9 of the drawings which illustrate a graph showing the useful range of outer diameter-inner diameter ratios $a/b$ giving values of the spring constant M, this useful range being based on the above mentioned test results for $a/b$ ratios.

I have found that it is possible to construct a Belleville spring assembly having a non-linear force-deflection curve so proportioned as to produce a symmetrical restoring force characteristic of an object or mass to be isolated. Symmetrical vibrations of the mass will occur only if the restoring force of the Belleville spring assembly acts upon the mass in a symmetrical manner.

With the foregoing in mind, the plotting of a force-deflection curve for a Belleville spring assembly, such as illustrated in the graph of FIGURE 10, demonstrates that the inflection point on such a curve will occur when the Belleville spring is flat, that is when $\delta = h$. Since $\delta$=some deflection of the spring from its unstressed shape, then $\delta = 0$ before the Belleville spring is loaded and $\delta = h$ after loading of the spring places it in a flat stressed condition. The mass or object supported by the Belleville spring must have predetermined weight sufficient to deflect the Belleville spring to a flat state in order to achieve a symmetrical restoring force characteristic for the elastic suspension. When the Belleville spring acquires a flat state under the above-expressed condition, the elastic suspension is in static equilibrium or a neutral position above and below which the supported mass may be caused to vibrate symmetrically.

Once it is assumed that $\delta = h$, the weight of mass W imposed on the Belleville spring to produce a flat stressed condition therein can be calculated by observing that the force P on the Belleville spring as expressed in the Almen and Laszlo formula will be equal to the weight of the mass W. Thus, by substituting $h$ for $\delta$ in the Almen and Laszlo formula, $$W = P = \frac{Eht^3}{(1-\sigma^2)Ma^2}$$

Hence, the weight W of the mass necessary to deflect the Belleville spring to its flat stressed condition is therefore dependent upon the shape and the material composition of the Belleville spring.

To construct a Belleville spring assembly suitable as an isolator for a mass having a given weight, it occurred to me that a "zero" spring rate for a Belleville spring assembly at the neutral position of the elastic suspension if approximated would produce a stable Belleville spring elastic suspension having an infinitely low natural frequency provided this assembly is deflected to a flat stressed condition under the dead-weight load of the mass which it supports to the neutral position of the elastic suspension.

Almen and Laszlo have already determined what critical factors would be required to produce a "zero" spring rate at the inflection point. They obtained an expression for the spring rate $r$ at any point on the load-deflection curve of a Belleville spring elastic suspension by differentiating their formula thusly:

$$r = \frac{dP}{d\delta} = A[3\delta^2 - 6h\delta + 2(h^2 + t^2)]$$

where, by recourse to their formula, it simplifies this expression to write $$A = \frac{Et}{2(1-\sigma^2)Ma^2}$$

A being a constant for each particular spring.

Setting $r=0$, it follows that $[3\delta^2 - 6h\delta + 2(h^2+t^2)] = 0$ because $A \neq 0$. But at the neutral position of my elastic suspension, the Belleville spring assembly is flat with the result that $\delta = h$. Therefore, $$3h^2 - 6h^2 + 2h^2 + 2t^2 = 0$$

and $$2t^2 = h^2$$

or $$h/t = \sqrt{2}$$

Thus, if $h/t = \sqrt{2}$, a "zero" spring rate is provided at the equilibrium position or neutral position $\delta = h$ of the elastic suspension.

Further investigation revealed that the restoring force of the Belleville spring assembly would change as an odd function of displacement of the mass from the neutral position of the elastic suspension. Thus, I concluded that the Belleville spring elastic suspension would have a restoring force characteristic or a restoring force F such that $$F = Ax^3 + Bx$$

where $x$ is some displacement of the mass above or below its neutral position, and A and B are constants depending upon the physical properties of the Belleville spring.

The equation $F = Ax^3 + Bx$ will describe the same force-deflection curve for a Belleville spring elastic suspension as the previously noted Almen and Laszlo formula, since it is a linear transformation thereof. The linear relationships between the variables P and $\delta$ appearing in the Almen and Laszlo formula and the variables F and $x$, respectively, are $P = F + W$ and $\delta = h + x$, thereby yielding the following relationships for constants A and B:

$$A = \frac{Et}{2(1-\sigma^2)Ma^2}, B = A(2t^2 - h^2)$$

It can be seen that $B = 0$ if $h/t = \sqrt{2}$. I determined, therefore, that the restoring force for a Belleville spring elastic suspension where $h/t=\sqrt{2}$ would be $F=Ax^3$, which may be expressed as a cubic restoring force characteristic.

Under ideal circumstances, my Belleville spring assembly is constructed so that $h/t=\sqrt{2}$. Coupled with this restriction, $\delta=h$ at the neutral position of the elastic suspension, thereby causing the Belleville spring assembly to exert a non-linear restoring force changing as the cube of displacement of the mass from its neutral position. Such a Belleville spring elastic suspension is stable and yet will exhibit an infinitely low natural frequency. Accordingly, there will be no exciting frequency capable of producing a so-called resonant frequency condition with this elastic suspension accompanied by the magnification of the harmful effects of shock and vibration. It will be understood that a resonant frequency condition occurs when the exciting frequency substantially approximates the natural frequencies exhibited by an elastic suspension.

While a Belleville spring elastic suspension where $h/t=\sqrt{2}$ and $\delta=h$ at the neutral position represents an ideal system for isolating a mass having a given weight, good isolation will occur so long as the spring rate of the Belleville spring assembly at the neutral position of the suspension remains low. Thus, it is within the spirit of the present invention to construct a Belleville spring assembly for an elastic suspension such that $h/t$ lies in the range greater than 0 up to and including $\sqrt{2}$, but no greater than $\sqrt{2}$. This useful range contemplates the use of a Belleville spring assembly as a "hard spring" in that the spring rate increases as the deflection of the Belleville spring assembly increases due to an excitation of force or motion. For any value of $h/t$ less than $\sqrt{2}$, the restoring force may be stated $F=Ax^3+Bx$, as previously noted. A natural frequency of a Belleville spring elastic suspension for any value of $h/t$ greater than zero but less than $\sqrt{2}$ will exist and increases as B increases, thereby making such an elastic suspension practical if the exciting frequency is substantially greater than the natural frequency of the suspension.

The following relationships are therefore critical to an appreciation of my invention—(1) the Belleville spring assembly must be flat at the neutral position of the elastic suspension, thereby causing $\delta=h$ and $$W=\frac{Eht^3}{(1-\sigma^2)Ma^2}$$

and (2) the range of values for $h/t$ of the Belleville spring assembly must be greater than zero up to and including $h/t$ equals $\sqrt{2}$.

Figure 2:
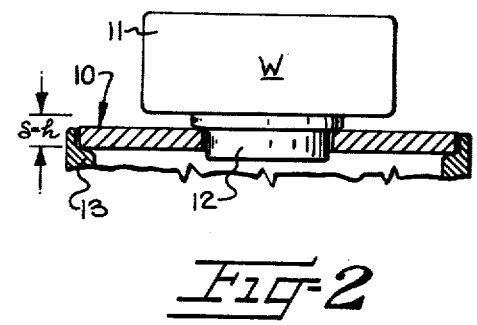
FIGURE 2 is a sectional schematic view of a Belleville spring elastic suspension for accommodating a given object (i.e. mass) in accordance with the present invention, wherein the Belleville spring of FIGURE 1 has assumed a flat stressed condition when placed under load by the object to be isolated.

In connection with the foregoing description, FIGURE 1 illustrates a Belleville spring or washer 10 constructed in accordance with the invention. The Belleville spring 10 has a thickness $t$ and a free cone height $h$ such that $h/t$ equals or approaches $\sqrt{2}$, and further includes an outer diameter $a$ and an inner diameter $b$. The Belleville spring 10 of FIGURE 1 is illustrated as supporting a mass or object 11 having a given weight W in FIGURE 2, there being a circular base or disc 12 depending from the main body of the mass 11, which is supported on the Belleville spring 10 along its inner diameter $b$ and forms a part of the mass 11. The Belleville spring 10 is freely supported along its outer diameter $a$ on an annular foundation 13 for flexing movement in either direction, upward or downward, depending upon the direction of an exciting force imposed upon the mass 11. The elastic suspension therefore comprises the Belleville spring 10 and the mass 11 which includes the circular base 12 and has a predetermined weight W, such that $$W=\frac{Eht^3}{(1-\sigma^2)Ma^2}$$

as previously explained. Thus, the Belleville spring 10 assumes a flat stressed condition, and $\delta=h$ at the neutral or equilibrium position of the elastic suspension. The elastic suspension exhibits an extremely low natural frequency which approaches zero as $h/t$ approaches $\sqrt{2}$.

Figure 3:
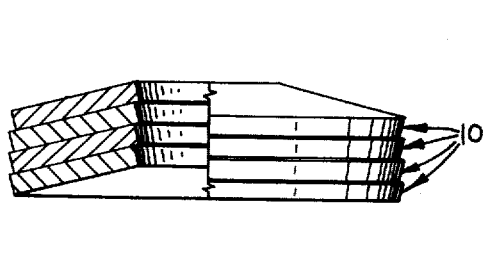
FIGURE 3 is a sectional view of a Belleville spring assemblly constructed in accordance with the present invention, wherein a plurality of Belleville springs are arranged in parallel stacked relationship, the Belleville spring assembly appearing in unstressed condition.
Figure 4:
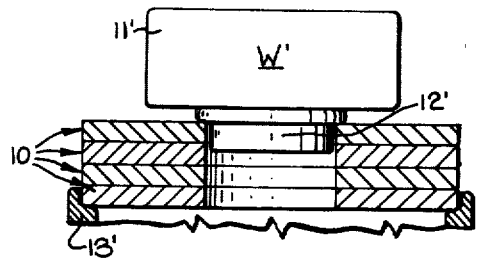
FIGURE 4 is a sectional schematic view of a Belleville spring elastic suspension utilizing the Belleville spring assembly illustrated in FIGURE 3, but showing the Belleville spring assembly when placed under load by a given object to be isolated, each of the Belleville springs assuming a flat stressed condition.

FIGURE 3 illustrates a modified Belleville spring assembly comprising a plurality of Belleville springs 10 (four such springs 10 being shown) which are stacked in parallel relationship to increase the load capacity of the Belleville spring assembly in accordance with the number of individual Belleville springs employed in the assembly. Thus, FIGURE 4 illustrates the Belleville spring assembly of FIGURE 3 under a loaded condition, wherein the predetermined weight W′ of the mass 11′ is four times that of the weight W of the mass 11 in FIGURE 2.

Figure 5:
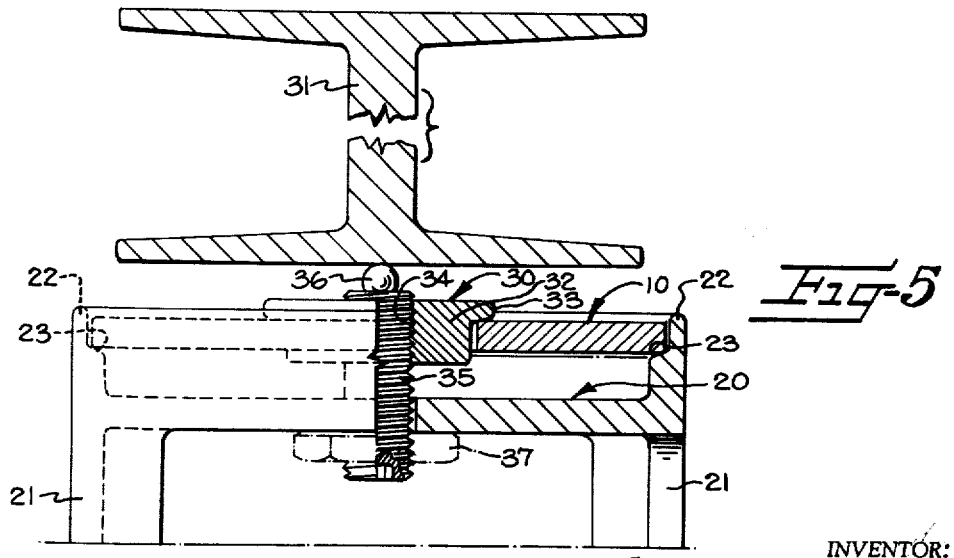
FIGURE 5 is an enlarged sectional view, partially broken away, of one practical embodiment of my invention illustrating a Belleville spring assembly in an elastic suspension for supporting an object, the Belleville spring being shown in flat stressed condition.

In FIGURE 5, one application of my improved Belleville spring elastic suspension is illustrated, such as providing earthquake protection for a building structure, it being understood that a plurality of such Belleville spring assemblies disposed at appropriate supporting locations will normally be required in an elastic suspension of this type. In this connection, the Belleville spring 10 is mounted for free upward and downward deflection on a platform 20 having feet 21 depending therefrom into engagement with the ground or flooring surface and an upwardly extending annular skirt 22 provided with an an internal shoulder 23 against which the lower outer peripheral edge of the Belleville spring 10 abuts. Since the weight of the mass to be supported must be of a predetermined magnitude just sufficient to place the Belleville spring 10 in a flat stressed condition under load at the neutral or equilibrium position of the elastic suspension, adjustment means 30 are provided to permit temporary clamping of the Belleville spring 10 in a flat condition before the Belleville spring 10 is actually subjected to the load imposed thereon by the building structure, shown as I-beam 31. The adjustment means 30 may take the form of an annulus 32 having an upper circular flange 33 of enlarged diameter adapted to be supported atop the upper inner peripheral edge of the Belleville spring 10 and provided with a central bore 34 for threaded reception of a bolt 35 extending therethrough. The upper end of bolt 35 is provided with suitable means such as a ball element 36 upon which the I-beam 31 is to be balanced. It will be noted that the bolt 35 extends loosely through an aperture formed in the platform 20 for threaded reception with a retainer nut 37 (shown in phantom lines) which clamps the Belleville spring 10 and adjustment means 30 to the platform 20 during the initial stages of mounting the object to be isolated on the several Belleville spring assemblies. Once the weight of the object has been approximately equated to the dimensions of the Belleville spring 10 when unstressed, the object (i.e. I-beam 31) is balanced on the ball element 36 and the retainer nut 37 is withdrawn from the bolt 35, whereupon the adjustment means 30 comprising the annulus 32, bolt 35, and ball element 36 forms a part of the total weight supported by the Belleville spring assembly in the elastic suspension. Slight deviations of the Belleville spring 10 from the flat state at the equilibrium position of the elastic suspension can be corrected by adding or subtracting weight from the total mass which includes the I-beam 31 and the adjustment means 30 until the flat state of the Belleville spring 10 is achieved. Where it is not feasible to add or subtract weight from the mass to be supported, the Belleville spring may be changed to one having dimensions correlating to the weight of the mass for assuming a flat state at the equilibrium position of the elastic suspension. By constructing the elastic suspension of FIGURE 5 in accordance with the aforesaid critical relationships, effective isolation of the object being supported can be obtained. Under ideal conditions when $h/t=\sqrt{2}$ and $\delta=h$ at the neutral position of the elastic suspension, external exciting forces—such as created by the wind, for example—could not establish a resonant frequency condition with the isolated mass inasmuch as the elastic suspension including the mass will exhibit an infinitely low natural frequency.

FIGURE 6 illustrates another application of a Belleville spring assembly in my improved elastic suspension, it being noted that the Belleville spring assembly comprises a pair of parallel Belleville springs 10, 10 with a friction disc 38 of rubber or similar elastomeric material interposed therebetween—the entire sandwich assembly 10, 38, 10 being disposed in a flat stressed condition when placed under load by a mass having a predetermined weight. In the embodiment of FIGURE 6, the Belleville spring assembly isolates the leg 39 of a vibrating machine to prevent or substantially reduce the transmission of vibrations to the floor on which the machine stands. The Belleville spring sandwich assembly 10, 38, 10 is mounted on the open upper end of a casing or cup 40 which includes a cylindrical upper end portion 41 encircling the leg 39 and a spherical lower end portion 42 spaced below the leg 39 and in engagement with a rubber pad 43 placed on the floor or other grounding member. The rubber pad 43 serves to prevent lateral movement of the spherical end portion 42 of cup 40.

The Belleville spring sandwich assembly 10, 38, 10 is retained on the cup 40 by an external cylindrical sleeve 44 having an annular radially inturned flange 45 at its upper end in abutment with the upper Belleville spring 10 of the sandwich assembly, the sleeve 44 being received in press fit relationship about the cylindrical portion 41 of the cup 40. An internal cylindrical cup member 46 is pressed within the cup 40 to dispose its upper end edge in abutment with the lower Belleville spring 10 of the sandwich assembly, the internal cup member 46 having a bottom wall 47 suitably apertured to loosely receive the leg 39 therethrough. Thus, the Belleville spring sandwich assembly 10, 38, 10 is retained between the inturned flange 45 of the cylindrical sleeve and the upper end edge of cup member 46 in position on the open upper end of the cup 40 with the leg 39 extending freely therethrough, but having an enlarged collar portion 48 thereon atop the Belleville spring sandwich assembly in engagement with the uppermost Belleville spring 10 along its inner diameter to suspendingly support the leg 39 by the Belleville spring sandwich assembly. Suitable retainer means, such as a cotter pin 49, extends through alined apertures formed in the sleeve 44, the cup 40, the internal cup member 46, and the leg 39 to maintain the components of the elastic suspension in assembled relationship— it being noted that the aperture through the leg 39 is of substantial vertical width to permit upward and downward movement of the leg 39 in response to corresponding upward and downward deflection of the Belleville spring sandwich assembly 10, 38, 10 from its flat stressed condition assumed at the neutral position of the elastic suspension.

In FIGURES 7 and 8, a further modified arrangement of a Belleville spring assembly constructed in accordance with my invention is disclosed, the modified arrangement taking the form of a symmetrical parallel-series Belleville spring assembly to increase the deflection range and load capacity of the Belleville spring assembly. Thus, in the particular illustrated embodiment, three groups or sets 50, 51 and 52 of Belleville springs are arranged in vertical alinement, there being a pair of parallel Belleville springs in stacked relationship comprising each group. The bottom group 52 rests upon an annular support 53 and is disposed in parallel relationship to the top group 50 with the convex surfaces of the individual Belleville springs in these groups disposed upwardly. The intermediate group 51 is arranged with the convex surfaces of the individual Belleville springs therein disposed downwardly.

Means are provided to maintain the groups 50, 51 and 52 in vertically spaced relationship, such means comprising outer and inner spacer rings 54 and 55 interposed between the top and intermediate groups 50, 51 and the intermediate and bottom groups 51, 52, respectively. The outer spacer ring 54 engages the proximal Belleville springs of the top and intermediate groups 50, 51 on its opposite sides along the outer diameter thereof. The outer spacer ring 54 includes upper and lower marginal flanges spaced radially outwardly from the top and intermediate groups 50, 51 of Belleville springs in overlying relation thereto. Similarly, the inner spacer ring 55 engages the proximal Belleville springs of the intermediate and bottom groups 51, 52 on its opposite sides along the inner diameters thereof and includes upper and lower marginal flanges spaced radially inwardly from the intermediate and bottom groups 51, 52 of Belleville springs in overlying relation thereto. The marginal flanges of the outer and inner spacer rings 54, 55 serve as means to retain the groups 50, 51 and 52 of Belleville springs in centered relationship. The locations of the spacer rings 54 and 55 permit deflection of the Belleville spring assembly comprising the groups 50, 51 and 52 in either direction from the neutral position of the elastic suspension shown in FIGURE 8, wherein the individual Belleville springs in each of the groups 50, 51 and 52 assume a flat stressed condition when placed under load by a mass having a predetermined weight.

In supporting an object by the Belleville spring assembly shown in FIGURE 7, a suitable base 56 is placed on the Belleville spring assembly for mounting an object 57 thereon in an evenly balanced state. The base 56, as shown, takes the form of an elongated shaft telescopically received within the Belleville spring assembly and having an enlarged upper end 60 resting atop the uppermost Belleville spring of the top group 50 along its inner diameter. The enlarged upper end 60 of the base 56 tapers to a point 61 upon which the object 57 is balanced. It will be appreciated that the total mass supported by the Belleville spring assembly of FIGURES 7 and 8 comprises the base 56 and the object 57, and it is the added weights of these latter two elements which is predetermined in constructing the elastic suspension so as to flatten the individual Belleville springs in the Belleville spring assembly at the neutral or equilibrium position of the suspension. In the particular Belleville spring assembly illustrated in FIGURES 7 and 8, the deflection range of the Belleville spring assembly is tripled and the load capacity is doubled from that obtained in the single Belleville spring of FIGURES 1 and 2. It will be understood that numerous variations in the arrangement of the Belleville spring assembly are contemplated and come within the purview of this invention.

FIGURE 11 graphically illustrates the results to be obtained from my concept as opposed to conventional linear and non-linear elastic suspensions, wherein the frequency $1/T$ versus the amplitude $x_0$ of the vibration occurring in a vertically deflected mass where no damping occurs are plotted on coordinate axes. The dotted curve in FIGURE 11 is characteristic of conventional non-linear elastic suspensions, such as a mass supported by rubber, felt, or cork pads in that all such non-linear systems heretofore known have natural frequencies at small amplitudes. The dashed curve in FIGURE 11 represents a linear elastic suspension system, such as a mass supported by a helical spring, and shows that the natural frequency of a linear system is independent of the amplitudes—thereby allowing the amplitude to increase in response to periodic force excitation or motion excitation having the same frequency as the natural frequency of the elastic suspension. My improved Belleville spring elastic suspension is represented by the solid curve in FIGURE 11 which shows that when the Belleville spring assembly is constructed so that $h/t$ equals $\sqrt{2}$ for each Belleville spring in the assembly no natural frequency along a vertical axis is exhibited. In other words, there is no small range of amplitude such that the frequency of the system will be approximately constant. However, if in my Belleville spring elastic suspension $h/t$ is greater than zero but less than $\sqrt{2}$, then the dotted curve will be the characteristic curve.

The herein described Belleville spring assembly as exemplified by the various illustrated modifications contributes to an improved elastic suspension by providing a means to reduce the natural frequency of the elastic suspension to an infinitely low magnitude. By placing the individual Belleville springs of the Belleville spring assembly in a flat state under the load of a mass having a predetermined weight at the neutral or equilibrium position of the elastic suspension and providing for deflection of the Belleville spring assembly in either direction from this neutral position, I obtain the sought-after "hard-spring" effect in a Belleville spring although the Belleville spring is commonly regarded as having a "soft-spring" effect. The Belleville springs of my spring assembly may also be readily manufactured from spring material, such as spring steel, at low cost and combine the attributes of high load capacity, low vertical height (as compared to a helical spring), and ability to withstand drifting and deterioration (common shortcoming of a rubber pad when used as an isolator element)—all of which are desirable in an isolator element for an elastic suspension.

In the drawings and specification there have been set forth preferred embodiments of the invention and, although specific terms are employed, they are used in a generic and descriptive sense only and not for purposes of limitation, the scope of the invention being defined in the claims.

I claim:

1. An elastic suspension comprising:

(a) a pair of Belleville springs arranged in stack parallel relationship with an elastomeric friction disk sandwiched between said pair of springs, each of said springs having the general shape of a hollow truncated cone and having an annular outer periphery and an annular inner periphery, said springs being adapted to engage and support a mass applied centrally thereto adjacent the inner periphery thereof;

(b) a foundation member for engaging and supporting said spring assembly about the outer periphery thereof whereby the mass applied to said springs is elastically supported by said foundation member;

(c) each of springs having a ratio of free cone height to the wall thickness greater than 0 but no greater than $\sqrt{2}$;

(d) said springs being so selected that said springs of said assembly are flattened by the weight of a predetermined mass at the equilibrium position of the suspension.

2. An elastic suspension comprising:

(a) at least one Belleville spring, said spring having the general shape of a hollow truncated cone and having inner and outer annular peripheries;

(b) a foundation member supporting said spring about the outer periphery thereof, said foundation member being constructed and arranged to allow said spring to be freely deflected beyond the flattened position; and (c) a mass of a substantially constant, known weight mounted on said spring centrally thereof at the inner edge thereof whereby said mass is elastically supported on said foundation member through said spring;

(d) the ratio of the free cone height to the wall thickness of said spring being greater than 0 but no greater than $\sqrt{2}$;

(e) said spring being so selected that said spring is deflected to a flattened position by the known weight of said mass at the equilibrium position of the suspension.

3. An elastic suspension as defined in claim 2, wherein said suspension comprises a plurality of alined groups of uniform Belleville springs, means retaining said groups in spaced apart relationship, each of said groups comprising a plurality of Belleville springs arranged in stacked parallel relationship, each of said Belleville springs in said Belleville spring assembly being flattened by the weight of said mass at the equilibrium position of the elastic suspension and having identical ratios of free cone height to thickness.

4. An elastic suspension as defined in claim 3, wherein alternate groups are disposed in parallel relationship and adjacent groups are disposed with the parallel Belleville springs thereof in oppositely facing relationship when in unstressed state.

5. The structure defined in claim 2 wherein the ratio of the free cone height of said spring to the wall thickness of said spring equals $\sqrt{2}$.

6. The structure defined in claim 2 wherein the ratio of the outer diameter of said spring to the inner diameter of said spring is in the range of 1.7 to 4.25.

7. The structure defined in claim 2 wherein said spring is related to the magnitude of the weight of said mass in accordance with the formula $$W = \frac{Eht^3}{(1-\sigma^2)Ma^2}$$

in which $W$ = the weight of the mass
$E$ = Young's modulus for the material composition of said spring
$h$ = the free height of said spring
$t$ = the wall thickness of said spring
$\sigma$ = Poisson's ratio for the material composition of said spring
$M$ = a constant
$a$ = the outer diameter of said spring.

8. The structure defined in claim 7 wherein the ratio of the free cone height of said spring to the wall thickness of said spring equals $\sqrt{2}$.

9. The structure defined in claim 7 wherein said elastic suspension comprises a plurality of springs arranged in stacked parallel relationship, each of said springs being flattened by the weight of said mass and having identical ratios of free cone height to wall thickness.

10. The structure defined in claim 7 wherein the ratio of the outer diameter of said spring to the inner diameter of said spring is in the range of 1.7 to 4.25.

11. An elastic suspension for isolating and supporting a mass relative to a foundation member comprising, at least one Belleville spring, said spring having the general shape of a hollow truncated cone and having inner and outer annular peripheries, a foundation member supporting said spring about the outer periphery thereof, said foundation member being constructed and arranged to allow said spring to be freely deflected beyond the flattened position, and a mass of substantially constant, known weight mounted on said spring centrally thereof at the inner edge thereof, whereby said mass is elastically supported on said foundation member through said spring, the ratio of the free cone height to the wall thickness of said spring being greater than zero but no greater than $\sqrt{2}$, the ratio of the outer diameter of said spring to the inner diameter of said spring being in the range of 1.7 to 4.25, said spring being so selected that said spring is deflected to a flattened position by the known weight of said mass at the equilibrium position of the suspension and the force (F) exerted by said spring on said mass to return said mass to the neutral, flattened position when said mass has been displaced from the flattened position by any given distance (x) may be expressed by the relationship $F = Ax^3 + Bx$, (a) where A is a constant depending upon the physical properties of said spring and may be expressed by the relationship $$A = \frac{Et}{2(1-\sigma^2)Ma^2}$$

in which $E$ = Young's modulus for the material composition of said spring
$t$ = the wall thickness of said spring
$\sigma$ = Poisson's ratio for the material composition of said spring
$M$ = a constant
$a$ = the outer diameter of said spring, (b) where B is a constant depending upon the physical properties of said spring and may be expressed by the relationship $$B = A(2t^2 - h^2)$$

where $h$ is the free height of said spring in which a curve plotted on the coordinates of $F$ vs. $x$ will have a zero slope at no more than one point on the curve.

References Cited in the file of this patent

UNITED STATES PATENTS

| | | |
|---|---|---|
| 2,263,107 | Smirl | Nov. 18, 1941 |
| 2,325,193 | Nutt et al. | July 27, 1943 |
| 2,655,935 | Kinzbach | Oct. 20, 1953 |
| 2,939,663 | Suozzo | June 7, 1960 |
| 3,010,713 | Turkovich | Nov. 28, 1961 |

OTHER REFERENCES

"Mechanical Springs" (Wahl), The Fenton Publishing Co. (Cleveland, Ohio), 1944, pages 238–262.

UNITED STATES PATENT OFFICE
CERTIFICATE OF CORRECTION

Patent No. 3,107,905  
October 22, 1963

Charles D. Lucas

It is hereby certified that error appears in the above numbered patent requiring correction and that the said Letters Patent should read as corrected below.

Column 9, line 42, before "springs" insert -- said --.

Signed and sealed this 21st day of April 1964.

(SEAL)  
Attest:  
ERNEST W. SWIDER  
Attesting Officer

EDWARD J. BRENNER  
Commissioner of Patents